United States Patent [19]
Little et al.

[11] Patent Number: 6,029,538
[45] Date of Patent: *Feb. 29, 2000

[54] REPLACEABLE BEARING CARTRIDGE ASSEMBLY FOR FLYWHEEL ENERGY SYSTEM

[75] Inventors: Scott R. Little; Joseph F. Pinkerton, both of Austin, Tex.

[73] Assignee: Active Power, Inc., Austin, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/925,548

[22] Filed: Sep. 8, 1997

[51] Int. Cl.$^7$ .............................. G05G 1/00; F16G 41/00
[52] U.S. Cl. .............................. 74/572; 384/903; 384/624
[58] Field of Search .............................. 74/572; 384/489, 384/536, 903, 624

[56] References Cited

U.S. PATENT DOCUMENTS 5,873,285  2/1999  Barnes ...................................... 74/572

FOREIGN PATENT DOCUMENTS 2754623  6/1979  Germany ................................. 74/572

Primary Examiner—David A Bucci
Assistant Examiner—Chong H. Kim
Attorney, Agent, or Firm—Fish & Neave; Robert W. Morris; Brett G. Alten

[57] ABSTRACT

A replaceable bearing cartridge assembly for use in a flywheel energy system and methods and apparatus for installing and removing the assembly are provided. The assembly includes a hollow bearing cartridge, an annular bearing, and an annular bearing retaining ring. The cartridge has an outer surface which is mounted at a port of a flywheel housing end plate. The annular bearing is mounted in the cartridge and held in place by the annular bearing retaining ring. The retaining ring acts as a backup bushing if the primary bearing fails.

34 Claims, 8 Drawing Sheets

REPLACEABLE BEARING CARTRIDGE ASSEMBLY FOR FLYWHEEL ENERGY SYSTEM

BACKGROUND OF THE INVENTION

This invention relates to flywheel energy conversion systems and particularly to replaceable bearing cartridge assemblies that allow simple, rapid field replacement.

Bearings are critical components in flywheel energy conversion systems. Such systems normally include massive flywheels rotating at extremely high speeds. The bearings support these massive flywheels during rotation and must be replaced from time to time due to wear and tear or because the bearing has failed.

Unfortunately, bearing replacement can be difficult and time-consuming. For example, conventional bearing replacement normally requires a large clean work space, a hoist for handling heavy components, such as the flywheel, as well as other specialized tools. Moreover, replacement may take many hours and require the services of highly trained personnel, making bearing replacement expensive and the use of flywheel systems unattractive compared with other conventional energy backup systems, including chemical batteries and emergency generators.

Another problem associated with conventional flywheel energy systems is catastrophic bearing failure. Although such failure requires bearing replacement, which itself may be costly, such bearing failure may damage other components in the flywheel energy system. For example, if a bearing supporting the weight of a flywheel fails, the flywheel can fall during rotation, causing substantial damage to itself and other components in its path.

In view of the foregoing, it is an object of this invention to provide a replaceable bearing cartridge assembly for use in a flywheel energy conversion system, that allows simple and rapid field replacement.

It is another object of the present invention to provide a replaceable bearing cartridge assembly for use in a flywheel energy conversion system that prevents damage to system components in the event of catastrophic bearing failure.

It is also an object of the present invention to provide an improved flywheel energy conversion system that can be easily maintained.

SUMMARY OF THE INVENTION

These and other objects of the invention are accomplished in accordance with the principles of the invention by providing a replaceable bearing cartridge assembly for flywheel energy systems. Systems in which the assembly may be used include at least one flywheel having a rotor shaft for rotation about a rotor axis in a housing having an end plate. The housing end plate has a port that is substantially coaxial with the rotor axis. The assembly includes a hollow bearing cartridge, an annular bearing, and an annular bearing retaining ring. The cartridge has an inner surface, an outer surface, a longitudinal axis, a first axial end, and a second axial end. A portion of the outer surface is fixedly mounted to the housing end plate at the port. The annular bearing has a rotational axis, an inner surface, and an outer surface. The bearing outer surface is mounted to the cartridge inner surface near the first end and wherein the bearing inner surface at least partially supports the rotor shaft. The bearing rotational axis is coaxial with the rotor axis. The annular bearing retaining ring is mounted to the cartridge adjacent the bearing for retaining the bearing in the cartridge.

A bearing cartridge assembly puller for removing such an assembly is also provided. The puller includes a body, at least one fastener, and a threaded pin. The body has a substantially flat surface and a threaded passage having a longitudinal axis perpendicular to the flat surface. The fastener fixedly mounts a portion of the flat surface to the second end of the cartridge. The threaded pin has a tip portion and a length that is greater than the assembly length. The pin matingly engages the threaded passage so that when the pin is rotated, the tip portion applies a force to the rotor end, thereby causing the assembly to move axially away from the flywheel rotor shaft.

A bearing cartridge assembly pusher for installing such an assembly is also provided. The flywheel rotor shaft of the flywheel energy system should have a threaded end. The assembly pusher includes a threaded bolt, a sleeve, and a nut. The threaded bolt has a length, a longitudinal axis, an outer diameter, and a threaded tip portion for meshing with the threaded rotor end. The sleeve is mounted around the bolt. The sleeve has an inner diameter greater than the outer diameter of the bolt so that the sleeve can slide freely along the longitudinal axis of the bolt. The nut is rotatably mounted on an end of the bolt opposite the threaded tip. This insures that when the nut is rotated in one direction the sleeve is forced by the nut toward the threaded tip portion of the bolt. This action allows the bearing assembly to be pushed over the threaded rotor end to complete installation.

Methods of removing and installing a bearing cartridge assembly according to this invention are also provided.

Further features of the invention, its nature and various advantages will be more apparent from the accompanying drawings and the following detailed description of the preferred embodiments.

DETAILED DESCRIPTION OF THE PREFERRED EMBODIMENTS

Figure 1A:
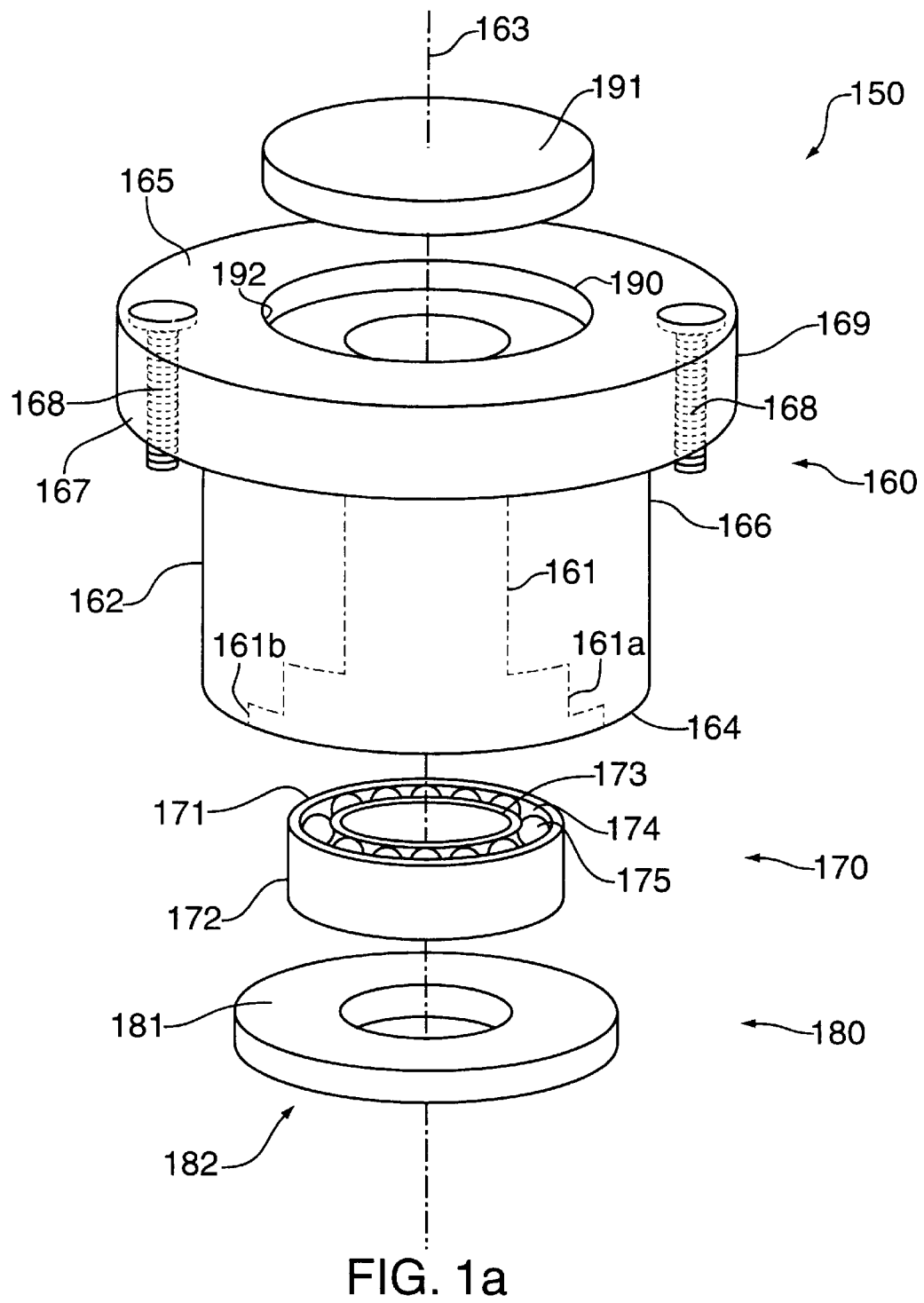
FIG. 1a is an exploded view of an illustrative embodiment of a replaceable bearing cartridge assembly, constructed in accordance with the principles of the present invention.

FIG. 1 shows a replaceable bearing cartridge assembly 150 for use in flywheel energy system 100, constructed in accordance with the principles of this invention. System 100 has at least one flywheel 110 having rotor shaft 120 for rotation about rotor axis 130 in housing 140, which encloses flywheel 110. Housing 140 includes housing end plates 142, each of which has port 141, which is substantially coaxial with rotor axis 130.

Bearing cartridge assembly 150 includes at least three elements: hollow bearing cartridge 160, annular bearing 170, and annular bearing retaining ring 180. Bearing cartridge 160 has inner surface 161, outer surface 162, longitudinal axis 163, first axial end 164, and second axial end 165. During operation, portion 166 of outer surface 162 is fixedly mounted to housing end plate 142 at port 141, preferably at least partially in port 141. Annular bearing 170 shares the same rotational axis as rotor shaft 120 (e.g., axis 130), has inner surface 171, and outer surface 172. Bearing outer surface 172 is mounted to cartridge inner surface 161, preferably near first end 164 so that bearing inner surface 171 at least partially supports rotor shaft 120. Annular bearing retaining ring 180 is mounted to the cartridge adjacent the bearing for retaining the bearing in the cartridge. Preferably, ring 180 is mounted at first axial end 164 of cartridge 160.

Figure 1B:
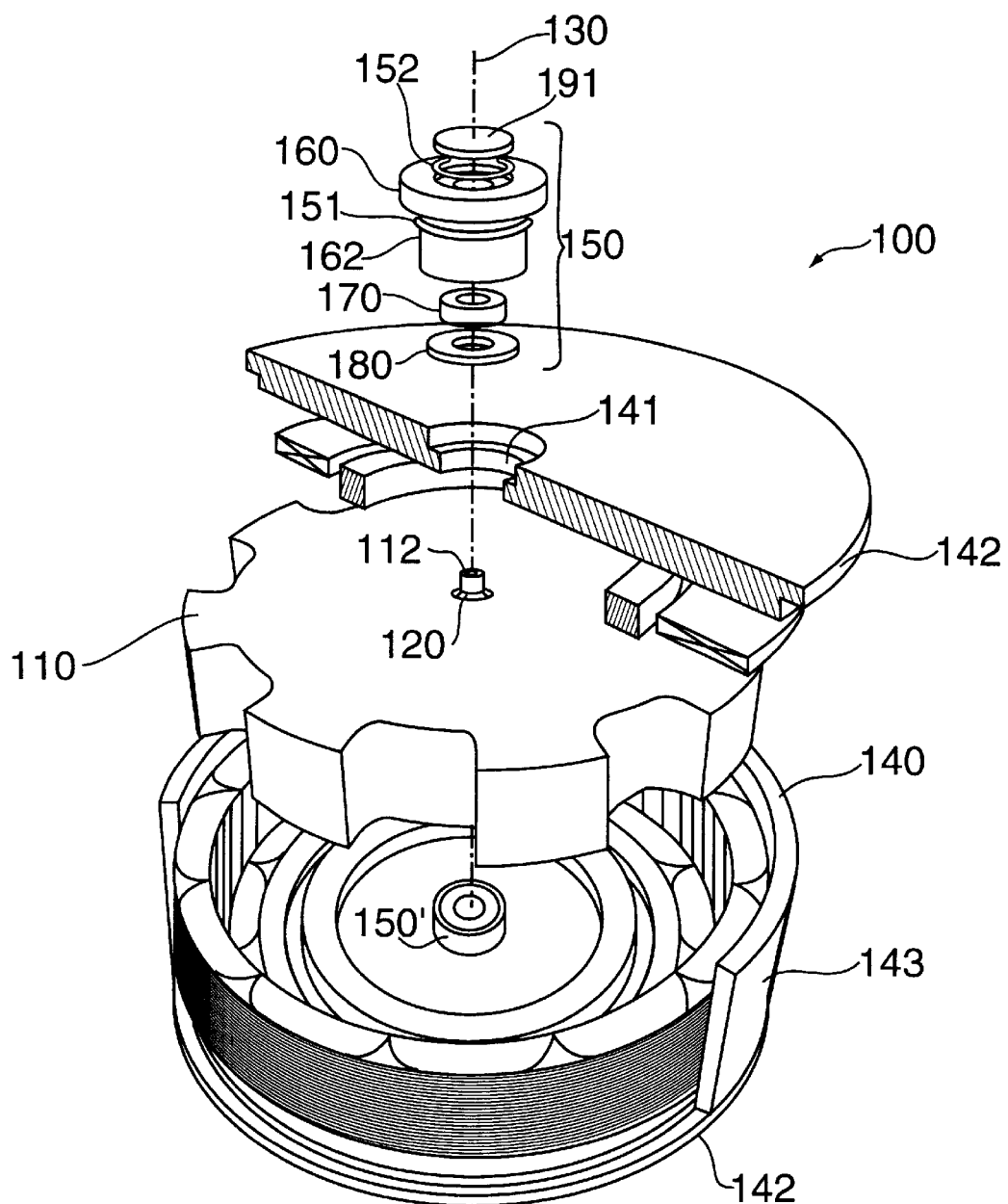
FIG. 1b is an exploded view of the replaceable bearing cartridge assembly shown in FIG. 1 with a flywheel energy system, constructed in accordance with the principles of the present invention.
Figure 1C:
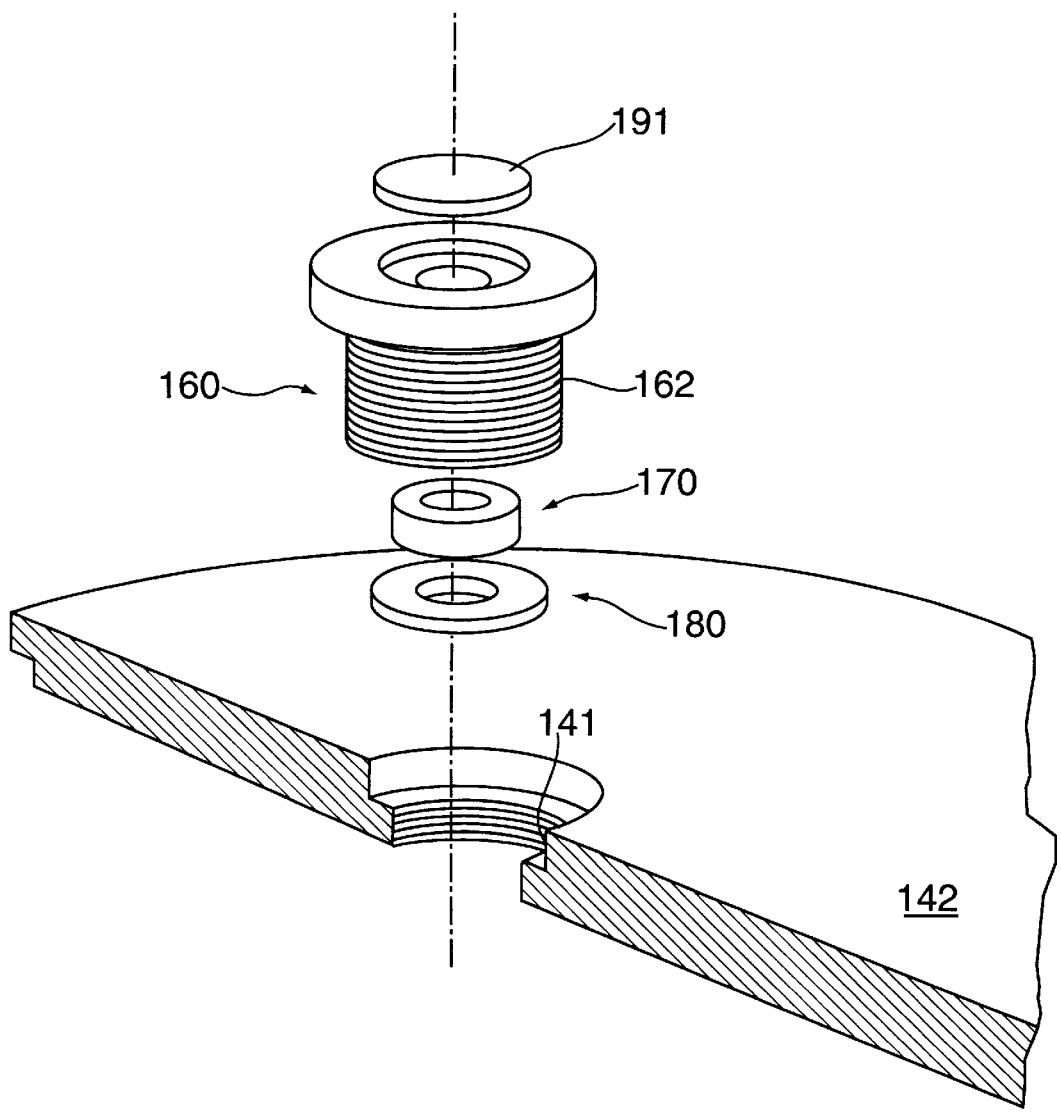
FIG. 1c is an exploded view of a replaceable bearing cartridge assembly with a flywheel energy system housing end plate, constructed in accordance with the principles of the present invention.
Figure 1D:
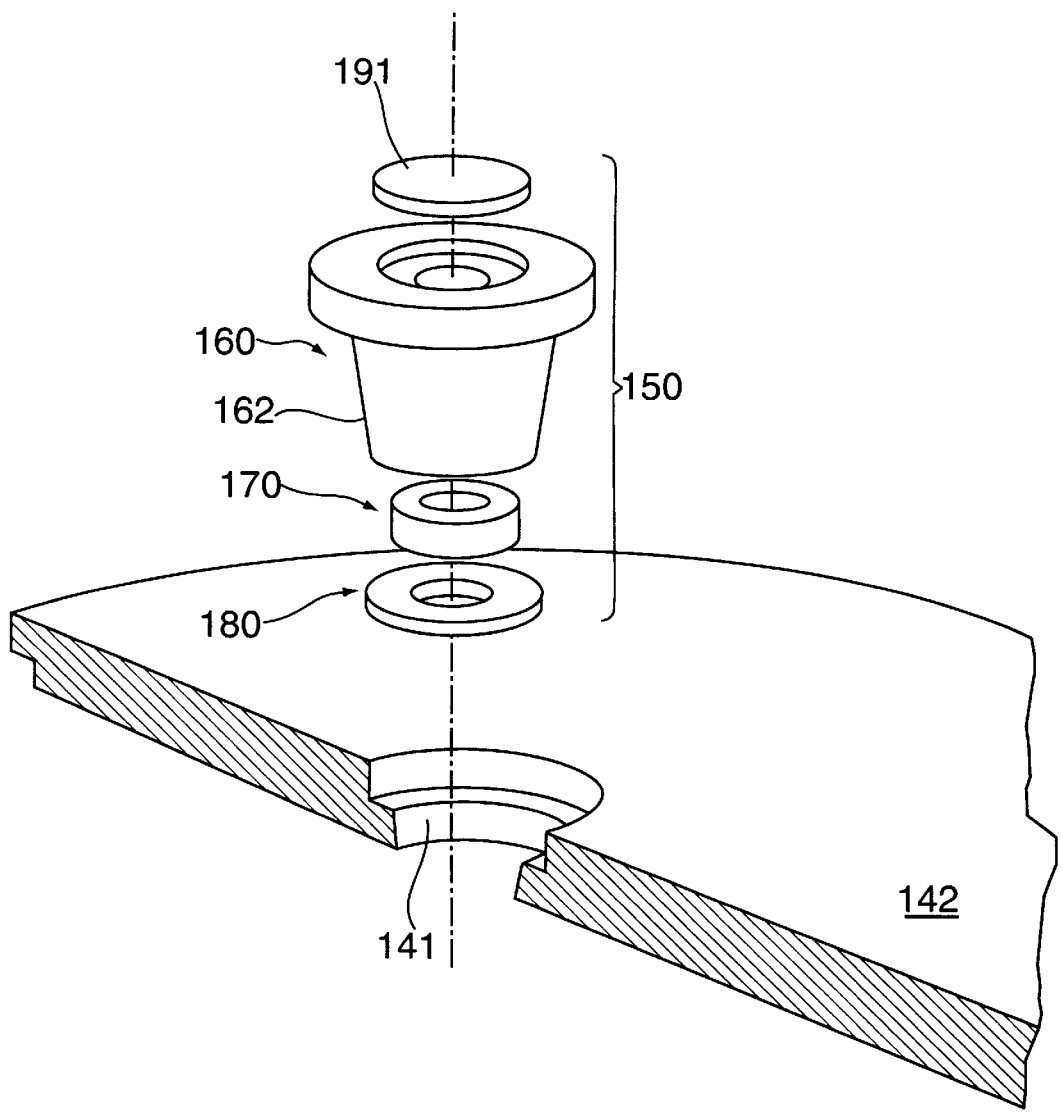
FIG. 1d is an exploded view of a replaceable bearing cartridge assembly with a flywheel energy system housing end plate, constructed in accordance with the principles of the present invention.

Cartridge 160 preferably includes radially flanged portion 167 at second end 165 of cartridge 160. Flanged portion 167 may be used to mount and/or fasten assembly 150 to housing end plate 142. For example, flanged portion 167 may be fixedly mounted to housing end plate 142 using one or more bolts 168. Alternatively, as shown in FIG. 1c, a portion of outer surface 162 of cartridge 160 and port 141 may be provided with mating threads for mounting and unmounting assembly 150 by screwing and unscrewing cartridge 160, respectively. Flanged portion 167 could then serve as a mechanical stop, preventing assembly 150 from screwing too far into port 141. Flanged portion 167 is especially important so that a used or damaged assembly may be quickly and reproducibly replaced. Also, as shown in also FIG. 1d, port 141 and cartridge outer surface 162 may be tapered along their longitudinal axis. When a vacuum seal is desired, o-ring (151), such as a rubber o-ring, may be mounted between flanged portion 167 and housing end plate 142.

Figure 1E:
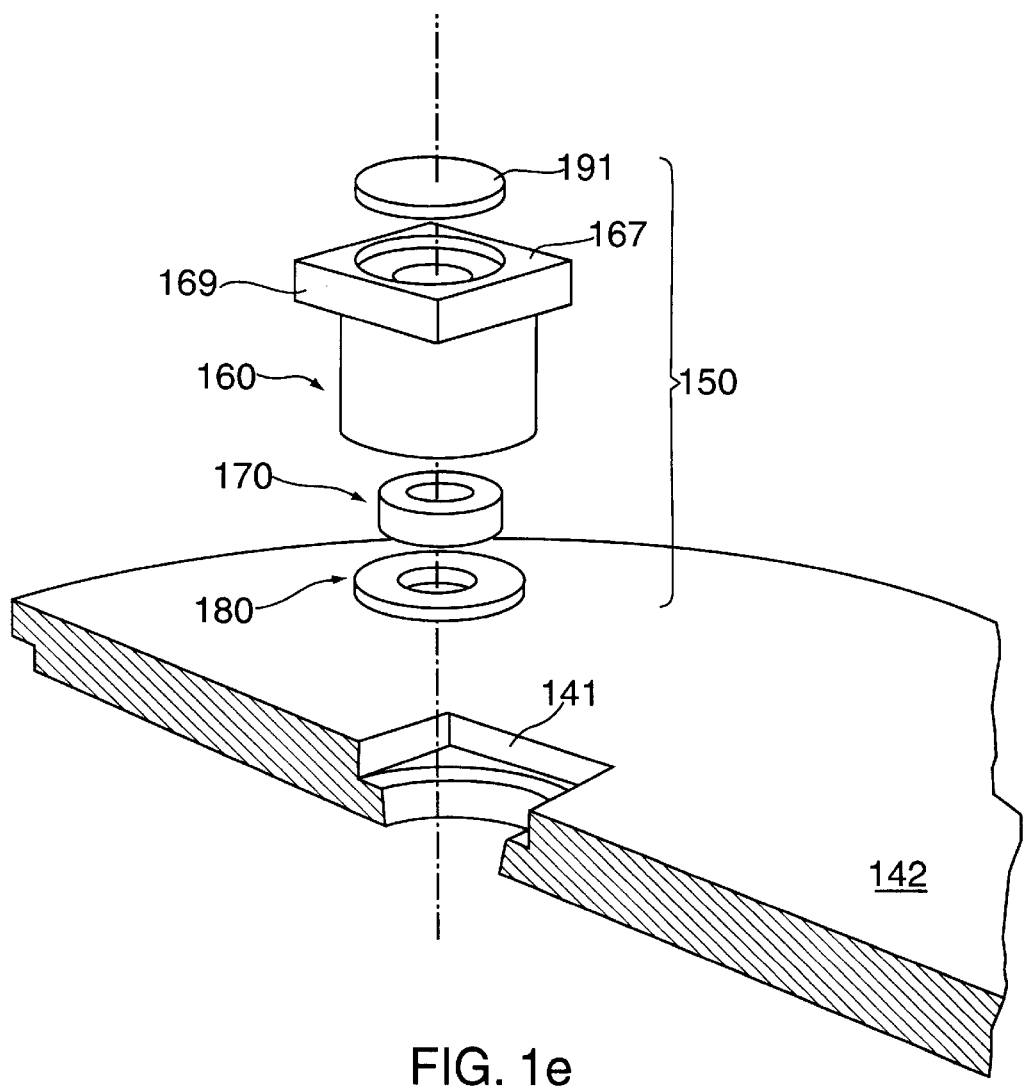
FIG. 1e is an exploded view of a replaceable bearing cartridge assembly with a flywheel energy system housing end plate, constructed in accordance with the principles of the present invention.

Outer surface 169 of flanged portion 167 may have a substantially cylindrical shape, which can easily be fabricated using conventional lathing techniques. Alternatively, as shown in FIG. 1e, outer surface 169 of flanged portion 167 may have a non-cylindrical shape and port 141 of housing end plate 142 a corresponding recessed portion adapted to receive said flanged portion.

Second end 165 of hollow cartridge 160 may be open through aperture 190, which has a longitudinal axis that is substantially coaxial with cartridge longitudinal axis 163. Aperture 190 provides access to rotor shaft 120, which may be used during installation and replacement of assembly 150. When it is desired to isolate bearing 171 from atmosphere during operation, assembly 150 may further include cover plate 191 which can be mounted over, or in, aperture 190. To ensure a proper seal, a cover plate o-ring may be mounted between cover plate 191 and hollow bearing cartridge as well. Preferably, aperture 190 has seat 192 adapted to receive cover plate 191.

Cartridge 160 is preferably made from a relatively hard material, such as steel, especially heat-treated steel, in order to securely hold in place bearing 170 and retaining ring 180. In contrast, bearing retaining ring 180 is preferably made from a relatively soft metal, such as a Babbitt metal, to prevent galling with flywheel 110 if bearing 170 fails. When rotor shaft 120 is integral with flywheel 110, retaining ring 180 is also preferably softer than rotor shaft. Cartridge 160 may also be made from a non-magnetic material®

By using materials of different hardness, galling between sliding surfaces is prevented. For example, as shown in FIG. 1b, axis 130 may be oriented vertically and the weight of flywheel 110 may be partially, and possibly substantially, supported by bearing assembly 150', which is located under flywheel 110. Bearing assembly 150' may be identical in structure to bearing assembly 150, but oriented in an opposite direction. As shown best in FIG. 3, retaining ring 180 is closely spaced from flywheel surface 111. Preferably, that space is a fraction of an inch and decreases with decreasing radial distance. Bearing failure may be catastrophic and may lead to a complete disintegration of weight-supporting bearing 170. In that case, flywheel 110 would fall, contacting retaining ring 180 while rotating at high speed. Retaining ring 180 would vertically support and rotationally guide the rotation of flywheel 110 until flywheel 110 came to a stop due to the frictional force between flywheel surface 111 and retaining ring 180. In order to prevent galling between surface 111 and retaining ring 180 during the deceleration of flywheel 110, the materials from which they are made should have substantially different hardness. For example, if flywheel surface 111 is made from a hardened steel, retaining ring 180 may include brass, aluminum, bronze, or even a mild steel.

Cartridge inner surface 161 may have bearing seat 161a at first end 164 for mounting bearing 170 so that bearing outer surface 172 mounts in bearing seat 161a. While many types of annular bearings may be used in accordance with this invention, a deep-groove ball bearing is especially useful, especially when the bearing is mounted below the flywheel for supporting the weight of the flywheel, such as bearing 150' shown in FIG. 1b. In this case, the deep-groove ball bearing should be capable of substantially supporting an axial force at least equal to the weight of the flywheel. Thus, it will be appreciated that the bearing is capable of supporting the rotor shaft both radially and axially. Deep-groove ball bearing 170 includes inner race 173, outer race 174, and plurality of rolling elements 175 captured between races 173 and 174.

Bearing 170 is retained in cartridge 160 by retaining ring 180, which should be fixedly mounted to cartridge 160, preferably at first end 164 of cartridge 160. Retaining ring 180 may be attached to cartridge 160 with one or more screws (not shown) that extend axially between retaining ring 180 and first end 164 of cartridge 160. First end 164 of cartridge 160 may be provided with seat 161b in which retaining ring 180 is mounted. Retaining ring 180 has first side 181 and second side 182, wherein first portion 181a of first side 181 is mounted at first end 164 of cartridge 160 and second portion 181b of first side 181 prevents bearing 170 from axial motion.

Figure 3:
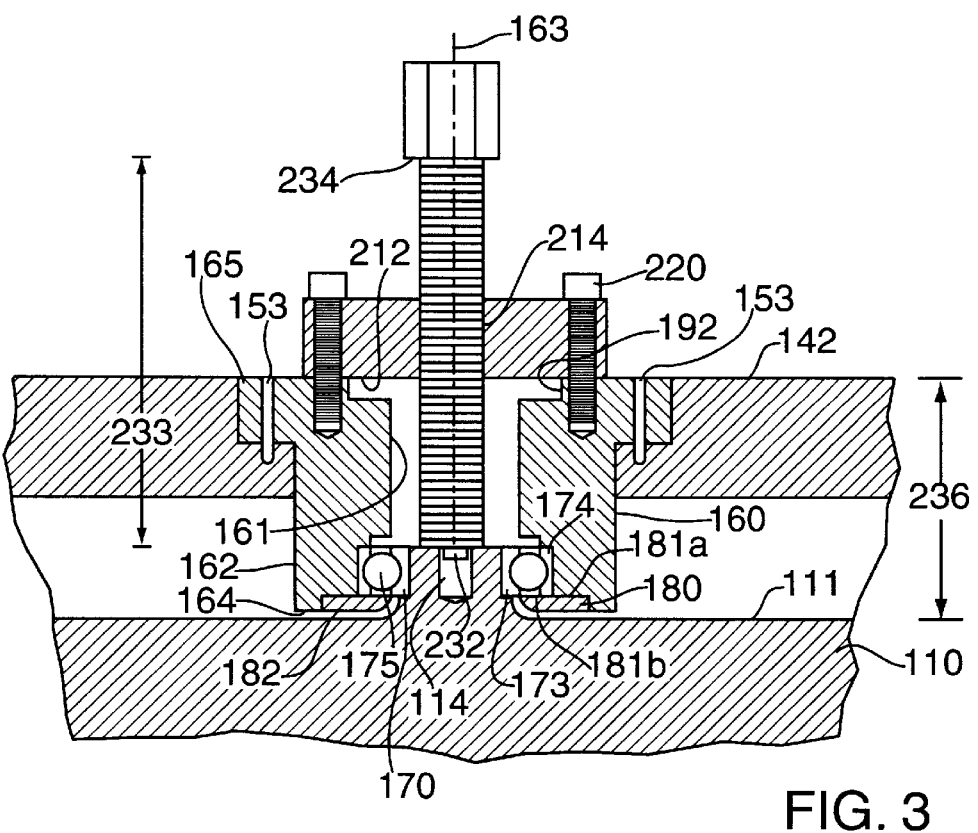
FIG. 3 is a cross-sectional view of the assembly puller shown in FIG. 2 mounted to an installed bearing cartridge assembly, constructed in accordance with the principles of the present invention.
Figure 4:
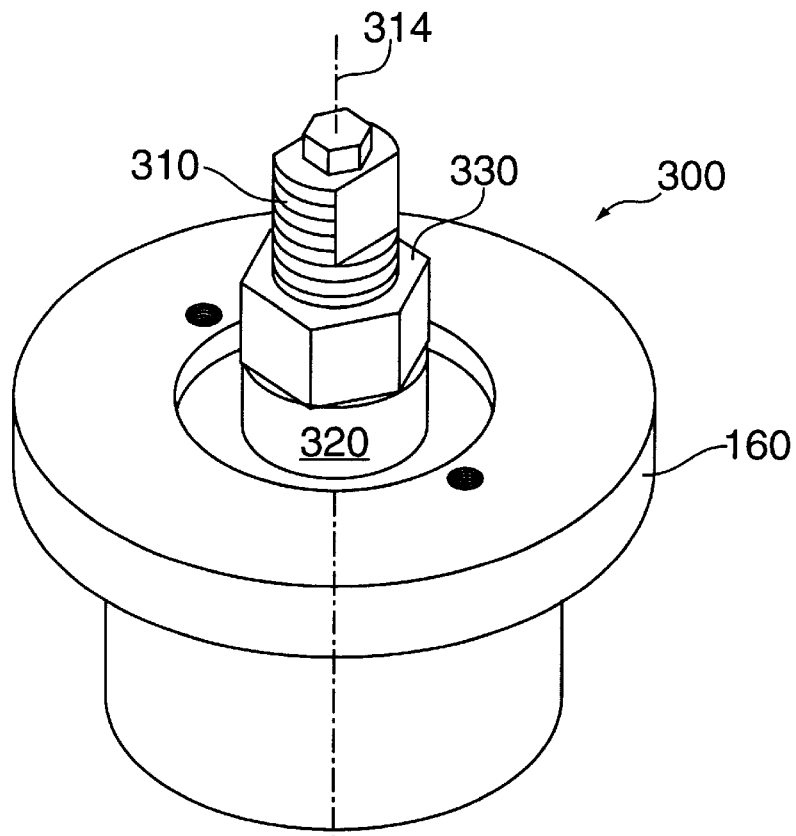
FIG. 4 is an elevation view of an illustrative embodiment of a replaceable bearing cartridge assembly pusher mounted to a bearing cartridge assembly, constructed in accordance with the principles of the present invention.
Figure 5:
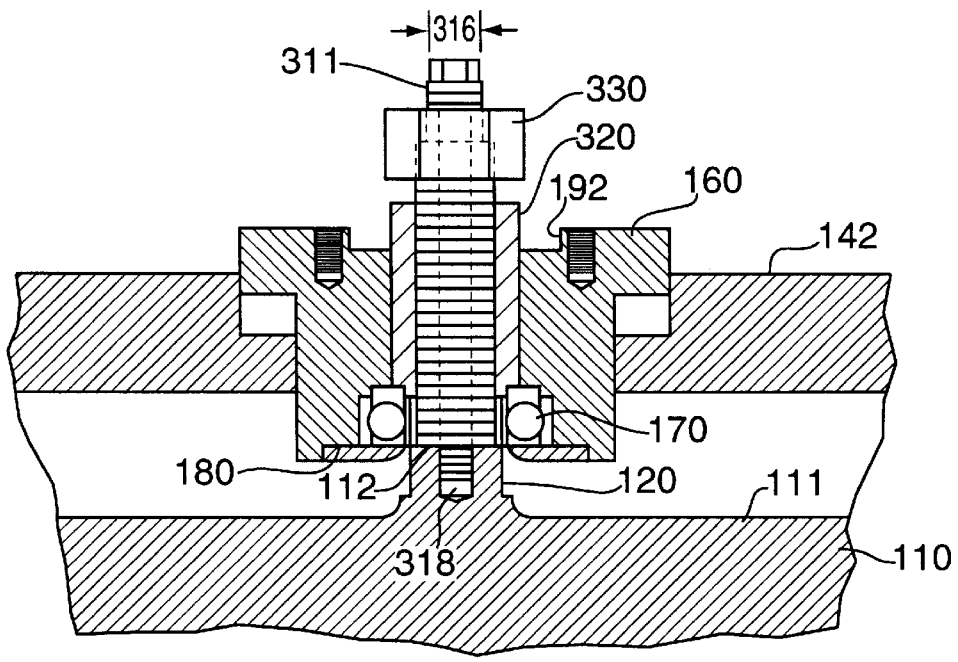
FIG. 5 is a cross-sectional view of the assembly pusher shown in FIG. 4 mounted to a bearing cartridge assembly during installation, constructed in accordance with the principles of the present invention.

Flywheel surface 111 at rotor shaft 120 and second side 182 of retaining ring 180 may be curved, as shown in FIGS. 3 and 5. The curved surfaces must be spaced so that there is a small radial and axial clearance between them. The radial distance between the two surfaces at any axial position near rotor end 112 should be between about 0.1 mm and about 10 mm (e.g., about 1 mm). In this way, for any axial position, any point on curved flywheel surface 111 has a radial distance that is smaller than the radial distance to any point on second side 182 of retaining ring 180 in the vicinity of rotor end 112. More particularly, any point on flywheel curved surface 111 preferably has a radial distance that decreases axially from flywheel 110 toward rotor shaft end 112.

An important advantage of bearing assembly 150 is that it may be replaced quickly and easily. In some cases, one or more flywheel energy systems 100 are mounted in a cabinet, each having its own rotor shaft. Therefore, in order to ensure quick and easy bearing assembly replacement, flywheel system 100 should be mounted with sufficient space adjacent to housing end plates 142 to remove and install bearing assemblies 150 and 150' when replacement becomes necessary or desired, without removing flywheel energy system 100 from the cabinet.

Accordingly, a bearing cartridge assembly puller and pusher, for removal and installment of a bearing assembly, respectively, is now described, including methods for their operation.

Figure 2:
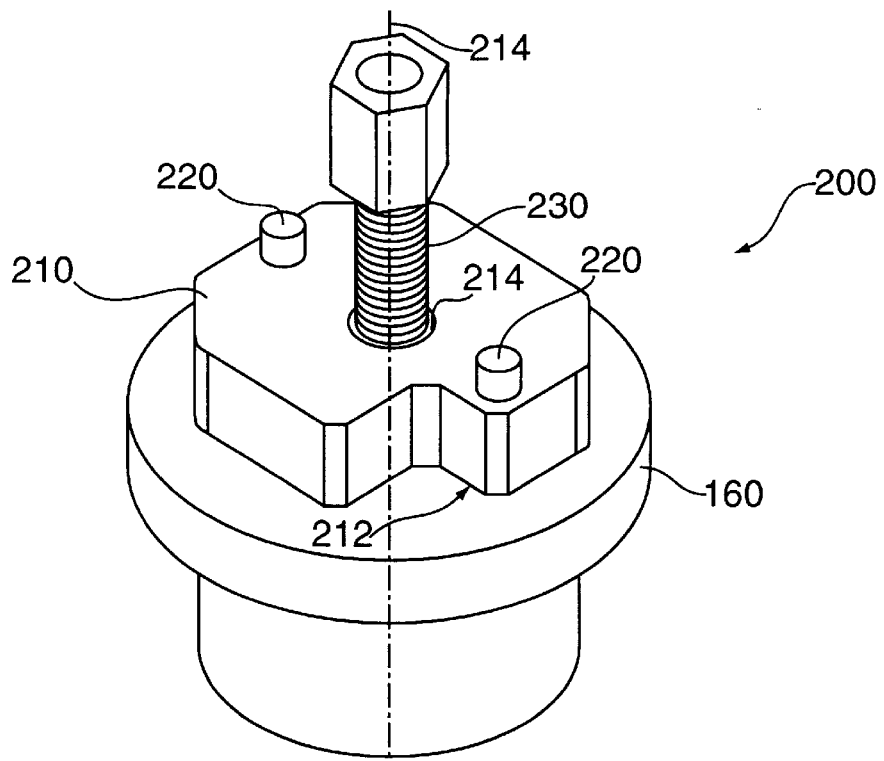
FIG. 2 is an elevational view of an illustrative embodiment of a replaceable bearing cartridge assembly puller mounted to a bearing cartridge assembly, constructed in accordance with the principles of the present invention.

FIGS. 2 and 3 show bearing cartridge assembly puller 200 for a flywheel energy system, such as flywheel energy system 100. Puller 200 includes body 210, at least one fastener 220, and threaded pin 230. Body 210 has substantially flat surface 212 and threaded passage 214, which has longitudinal axis 214 perpendicular to flat surface 212. Fasteners 220 are for fixedly mounting a portion of flat surface 212 to second end 165 of cartridge 160. Threaded pin 230 has tip portion 232 and length 233, which is measured from tip portion 232 to its other end 234. Pin length 233 is preferably greater than assembly length 236, which is measured from first end 164 to second end 165 of assembly 160. Pin 230 matingly engages with threaded passage 214. When pin 230 is rotated, tip portion 232 applies a force to rotor end 112, thereby moving assembly 150 axially away from rotor shaft 120 of flywheel 110.

A method of using puller 200 for removing a bearing cartridge assembly from a flywheel energy system in accordance with this invention is provided. In a first step, assembly 150 is unfastened from housing end plate 142. For example, this may involve rotating bolts 168 until they are removed from their respective bores 153 in cartridge 160. In a second step, bearing cartridge assembly puller 200 is mounted to second end 165 of cartridge 160 at port 141 so that tip portion 232 is disposed against rotor end 112 and flat portion 212 is disposed against second end 165 of cartridge 160. In a third step, threaded pin 230 is rotated so that tip portion 232 freely rotates on rotor end 112. When pin 230 rotates, tip portion 232 presses against rotor end 112 which causes body 210 to pull bearing cartridge assembly 150 from port 141 in housing end plate 142 and away from rotor shaft 120 until bearing 170 is no longer in contact with rotor shaft 120. When body 210 is pulled a distance approximately equal to said assembly length (minus the thickness of the flanged portion 167), assembly 150 is fully removed from port 141 of end plate 142.

Mounting puller 200 to cartridge assembly 150 may include fastening flat portion 212 of puller body 210 to cartridge 160. One way in which puller 200 may be fastened includes bolting flat portion 212 of body 210 to cartridge 160. Also, during mounting, tip portion 232 of pin 230 may be inserted into recessed portion 114 of rotor end 120 to prevent radial movement, or slippage.

When assembly 150 includes removable cover plate 191 mounted at second, or outer axial, end 165 of assembly 160, this method may further include removing cover plate 191 from assembly 150 before mounting puller 200 on assembly 150. Removal of cover plate 191 provides access to rotor shaft 120.

Once an old or defective bearing is removed from port 141, another must be replaced before flywheel energy system 100 can be operated. According to another aspect of this invention, that replacement assembly can be installed using bearing cartridge assembly pusher 300. In order for pusher 300 to work properly, rotor shaft end 120 should be threaded, and preferably internally threaded, as shown in FIG. 5. Assembly pusher 300 includes threaded bolt 310, sleeve 320, and nut 330. Threaded bolt 310 has longitudinal axis 314, outer diameter 316, and threaded tip portion 318 for engaging threaded rotor end 120. The length of bolt 310 should be sufficiently long so that when tip portion 318 engages rotor end 120, its other end 311 extends above sleeve 320 enough so that nut 330 can be rotatably mounted.

Sleeve 320 is preferably mounted around bolt 310. Sleeve 320 should have an inner diameter greater than outer diameter 316 of bolt 310 so that sleeve 320 can slide freely along longitudinal axis 314 of bolt 310. Nut 330 is rotatably mounted on end 311 of bolt 310 so that when nut 310 is rotated in one direction sleeve 320 is forced by nut 330 toward threaded tip portion 318 of bolt 310. When sleeve 320 is forced downward, sleeve 320 presses against bearing assembly 150, and preferably against bearing 170, which in turn pushes bearing assembly 150 over rotor end 120.

A method of using pusher 300 for installing a bearing cartridge assembly in a flywheel energy system in accordance with this invention is now provided. In a first step, bearing cartridge assembly pusher 300 is mounted inside assembly 150, as shown in FIG. 5. In a second step, threaded bolt 310 is rotated in a first bolt direction (not shown) so that threaded tip portion 318 matingly engages with threaded rotor end 120. In a third step, nut 330 is rotated in a first nut direction (not shown) so that when nut 330 is rotated in that direction sleeve 320 is pushed downward toward threaded tip portion 318. As explained immediately above, when sleeve 320 is forced downward, sleeve 320 presses against bearing assembly 150, and preferably against bearing 170, which in turn pushes bearing assembly 150 over rotor end 120.

After the replacement assembly is installed, pusher 300 may be removed by (1) rotating bolt 310 in a direction opposite the first bolt direction until threaded tip portion 318 is not engaged with threaded rotor end 120, and unmounting pusher 300 from rotor end 120 and assembly 150. When assembly 150 includes removable cover plate 191 (shown in FIGS. 1a and 1b), the method of installing may be completed by replacing cover plate 191 on assembly 150 after unmounting pusher 300. Unmounting pusher 300 may simply involve extracting or removing pusher 300 from the assembly.

Figure 6:
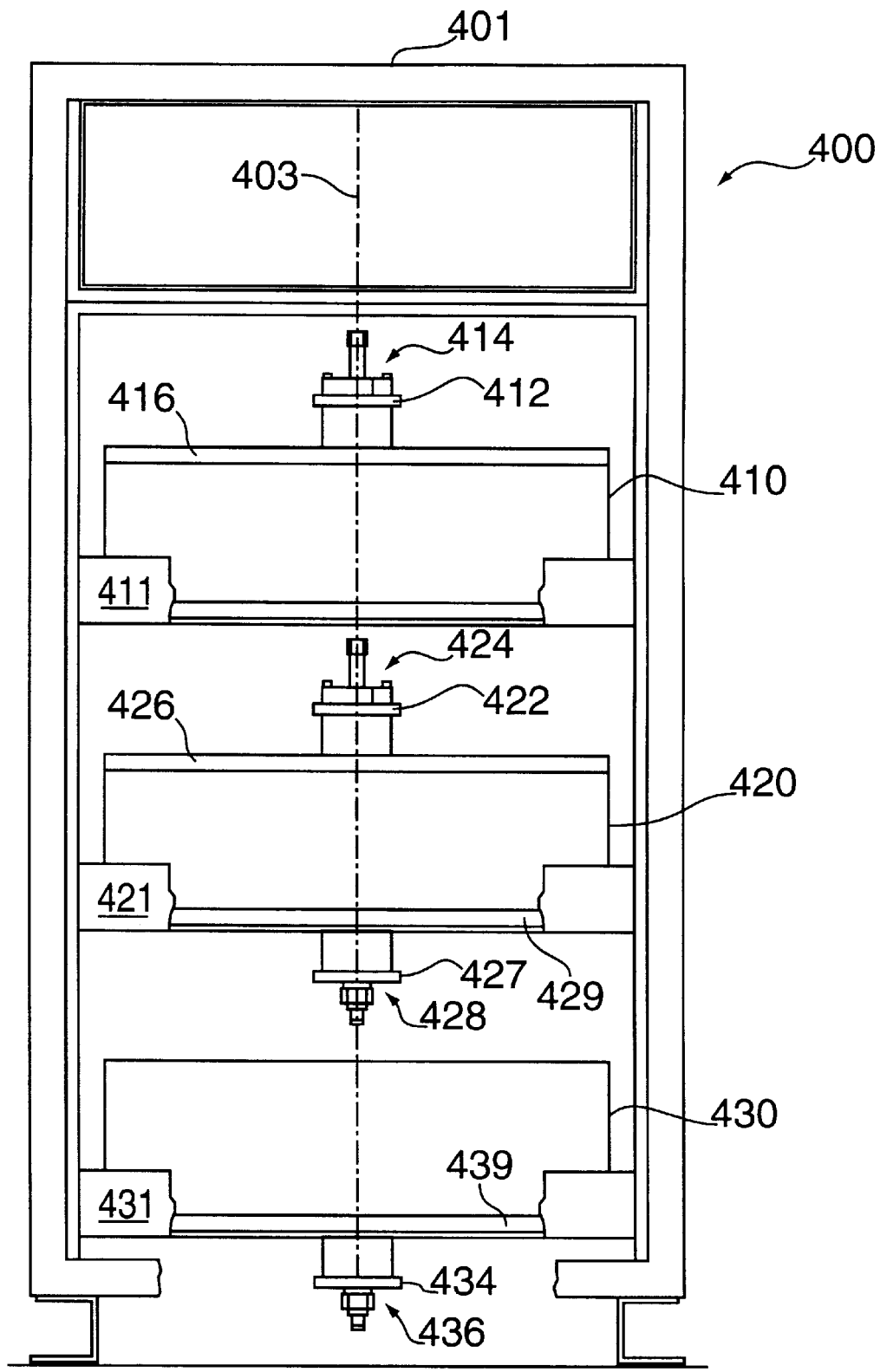
FIG. 6 is a cross-sectional view of an illustrative embodiment of a flywheel energy conversion unit that includes three flywheel systems, two assembly pullers, and two assembly pushers, constructed in accordance with the principles of the present invention.

FIG. 6 shows one embodiment of flywheel energy unit 400 constructed according to the present invention. Unit 400 includes three flywheel energy systems 410, 420, and 430 mounted in cabinet 401. As shown in FIG. 6, systems 410, 420, and 430 are mounted along a common vertical rotational axis 403, but each system may be mounted for rotation about different axes if desired. Of course, any number of flywheel systems could be incorporated into a cabinet, provided there exists sufficient space therein.

Each of the flywheel systems shown in FIG. 6 are supported by a frame in cabinet 401. In particular, flywheel systems 410, 420, and 430 are supported by brace 411, 421, and 431. The flywheels (not shown) in the flywheel systems are each supported by two bearing assemblies during operation. System 410, for example, includes an upper bearing assembly 412 and a lower bearing assembly (not shown). Bearing assembly 412, as shown in FIG. 6, is being pulled from housing end plate 416 by bearing assembly puller 414. A person of ordinary skill in the art will appreciate that bearing assembly 412 can be easily removed without removing flywheel 410, as long as sufficient space exists above housing end plate 416.

System 420 of unit 400 also includes an upper bearing assembly 422 and lower bearing assembly 427. Upper assembly 422, as shown in FIG. 6, is being pulled from end plate 426 by bearing assembly puller 424 in a fashion similar to assembly 412. Lower bearing assembly 427 is being pushed into lower end plate 429 by bearing assembly pusher 428. System 430 of unit 400 also shows lower bearing assembly 434 being pushed into lower end plate 439 by assembly pusher 436.

It will be understood that the foregoing is only illustrative of the principles of the invention, and that various modifications can be made by those skilled in the art without departing from the scope and spirit of the invention. For example, although FIGS. 3 and 5 show annular bearing 170 having spherical rolling elements 175, those rolling elements may be cylindrical or any other shape that provides reduced friction between inner race 173 and outer race 174. It should also be clear to a person of ordinary skill in the art that retaining ring 180 could retain bearing 170 in cartridge 160 by applying a force from the other side of bearing 170. In this case, bearing 170 would be inserted from second end 165 of cartridge 160, and the radial thickness of first end 164 would be increased so that a portion of first end 164 would sandwich bearing 170 between first end 164 and retaining ring 180. If first end 164 has a curved surface similar to second side 182 of retaining ring 180, then it could equally serve as a back-up bushing in the event of primary bearing failure. Also, it should be understood by a person of ordinary skill in the art that bolt 310 of pusher 300 may include two bolts—an inner bolt and a hollow outer bolt.

We claim:

1. A flywheel energy system comprising:
   at least one flywheel that has a rotor shaft for rotation about a rotor axis in a housing having an end plate, said housing end plate having a port that is substantially coaxial with said rotor axis; and
   a replaceable bearing cartridge assembly that can be mounted at said port, said assembly comprising:
   a hollow bearing cartridge having an inner surface, an outer surface, a longitudinal axis, a first axial end, and a second axial end, wherein a portion of said outer surface is fixedly mounted to said housing end plate at said port;
   an annular bearing having a rotational axis, an inner surface, and an outer surface, wherein said bearing outer surface is mounted to said cartridge inner surface near said first axial end and wherein said bearing inner surface at least partially supports said rotor shaft radially and axially, said bearing rotational axis being coaxial with said rotor axis; and
   an annular bearing retaining ring mounted to said cartridge adjacent to said bearing near said first axial end for retaining said bearing in said cartridge so that when said cartridge is removed from said port said bearing is also removed.

2. The flywheel energy system of claim 1 wherein said ring is mounted at said first axial end of said cartridge.

3. The flywheel energy system of claim 1 wherein said cartridge comprises a radially flanged portion at said second axial end.

4. The flywheel energy system of claim 3 wherein said cartridge is mounted to said housing end plate at said flanged portion.

5. The flywheel energy system of claim 4 further comprising a plurality of bolts, wherein said flanged portion is fixedly mounted to said housing end plate using said bolts.

6. The flywheel energy system of claim 4 wherein said port is threaded and said cartridge outer surface is matingly threaded for screwing said cartridge into said port.

7. The flywheel energy system of claim 4 further comprising a cartridge o-ring mounted between said flanged portion and said housing end plate.

8. The flywheel energy system of claim 4 wherein said port and said cartridge outer surface are tapered.

9. The flywheel energy system of claim 4 wherein said flanged portion has an outer surface having a substantially cylindrical shape.

10. The flywheel energy system of claim 4 wherein said outer surface of said flanged portion has a non-cylindrical shape and said housing end plate has a recessed portion at said port adapted to receive said flanged portion to prevent said cartridge from rotating about said longitudinal axis.

11. The flywheel energy system of claim 10 wherein said flanged portion has a polygonal shape.

12. The flywheel energy system of claim 4 wherein said second end is open through an aperture having a longitudinal axis that is substantially coaxial with said cartridge longitudinal axis.

13. The flywheel energy system of claim 12 further comprising a cover plate mounted at said aperture, said cover plate being for hermetically sealing said bearing.

14. The flywheel energy system of claim 13 further comprising a cover plate o-ring mounted between said cover plate and said hollow bearing cartridge in said aperture.

15. The flywheel energy system of claim 14 wherein said second end has a seat adapted to receive said cover plate.

16. The flywheel energy system of claim 1 wherein said cartridge is a relatively hard metal cartridge.

17. The flywheel energy system of claim 16 wherein said cartridge is a heat-treated steel cartridge.

18. The flywheel energy system of claim 1 wherein said cartridge is a non-magnetic material cartridge.

19. The flywheel energy system of claim 16 wherein said retaining ring comprises a relatively soft metal.

20. The flywheel energy system of claim 19 wherein said retaining ring comprises a Babbitt metal.

21. The flywheel energy system of claim 17 wherein said retaining ring consists of a material selected from a group consisting of a mild steel, aluminum, bronze, brass, and any combination thereof.

22. The flywheel energy system of claim 1 wherein said cartridge inner surface has a bearing seat at said first end, said bearing outer surface being mounted in said bearing seat.

23. The flywheel energy system of claim 1 wherein said bearing comprises a deep-groove ball bearing.

24. The flywheel energy system of claim 23 wherein said deep-groove ball bearing can substantially support an axial force at least equal to a weight of said flywheel system when said rotational axis of said flywheel is substantially vertical.

25. The flywheel energy system of claim 1 wherein said annular bearing comprises an inner race, an outer race, and a plurality of rolling elements captured between said races.

26. The flywheel energy system of claim 1 further comprising at least one fastener, said fastener for fixedly mounting said retaining ring to said first end of said cartridge.

27. The flywheel energy system of claim 26 wherein said fastener is a screw extending in an axial direction from said retaining ring to said first end of said cartridge.

28. The flywheel energy system of claim 1 wherein said second end of said cartridge has a seat in which said retaining ring is mounted.

29. The flywheel energy system of claim 1 wherein said retaining ring has a first side and a second side, and wherein a first portion of said first side is mounted to said first end of said cartridge and a second portion of said first side limits the axial motion of said bearing.

30. The flywheel energy system of claim 29 wherein said rotor shaft comprises a material and wherein said retaining ring comprises a material that is softer than said rotor shaft material.

31. The flywheel energy system of claim 1 wherein said flywheel has a curved surface that faces a curved surface of said retaining ring forming a clearance gap therebetween said gap being sufficiently small to prevent said flywheel from substantial axial and radial motion if said bearing fails during flywheel operation.

32. The flywheel energy system of claim 31 wherein said flywheel curved surface has a radial distance, said radial distance decreasing axially from said flywheel to said rotor shaft end.

33. A replaceable bearing cartridge assembly for a f first energy system, said system having at least one flywheel that has a substantially vertical rotor shaft for rotation about a rotor axis in a housing having an end plate mounted below said flywheel, said housing end plate having a port that is substantially coaxial with said rotor axis for mounting said assembly, said assembly comprising:

a hollow bearing cartridge having an inner surface, an outer surface, a longitudinal axis, a first axial end, and a second axial end, wherein a portion of said outer surface is fixedly mounted to said housing end plate at said port;

an annular bearing having a rotational axis, an inner surface, and an outer surface , wherein said bearing outer surface is mounted to said cartridge inner surface near said first axial end and wherein said bearing inner surface at least partially supports said rotor shaft radially and axially, said bearing rotational axis being coaxial with said rotor axis; and a n annular bearing retaining ring mounted to said cartridge adjacent to said bearing near said first axial end for retaining said bearing in said cartridge, wherein said flywheel rotor shaft has a curved surface that faces downward toward a curved surface of said retaining ring that faces upward, and wherein said curved surfaces form a clearance gap therebetween, said gap being sufficiently small to prevent said flywheel from substantial axial and radial motion if said bearing fails during flywheel operation.

34. The assembly of claim 33 wherein said rotor shaft comprises a material and wherein said retaining ring comprises a material that is softer than said rotor shaft material.

* * * * *